United States Patent [19]

Rosselli

[11] Patent Number: 4,845,635
[45] Date of Patent: Jul. 4, 1989

[54] COMPUTER CONTROLLED APPARATUS FOR IMPARTING A DESIGN ONTO THE SURFACE OF A CANDLE

[76] Inventor: Richard A. Rosselli, 614 Sheldon Dr., Newark, Del. 19711

[21] Appl. No.: 90,788

[22] Filed: Aug. 28, 1987

[51] Int. Cl.$^4$ ............... G05B 19/42; B29C 41/06
[52] U.S. Cl. ............... 364/474.01; 364/476; 364/474.21; 364/468; 425/150; 425/803
[58] Field of Search ............... 364/474, 476, 468, 168; 425/149, 155, 803

[56] References Cited

U.S. PATENT DOCUMENTS

| | | | |
|---|---|---|---|
| 4,170,860 | 10/1979 | Flinn et al. | 425/155 |
| 4,312,105 | 1/1982 | Brown | 364/474 |
| 4,382,215 | 5/1983 | Barlow et al. | 364/474 |
| 4,517,649 | 5/1985 | Kitagawa | 364/476 |
| 4,629,409 | 12/1986 | Satoh et al. | 364/476 |
| 4,633,720 | 1/1987 | Dybel et al. | 364/476 |

Primary Examiner—Michael R. Fleming
Assistant Examiner—P. Gordon
Attorney, Agent, or Firm—Samuel V. Abramo

[57] ABSTRACT

A system and method are disclosed for automatically stamping designs onto candles under computer control. For a given stamped mark, a turret selects the tool with a specific die is to be stamped. The turret orients the tool angle about the axis defined by the tool's travel line during stamping by use of a planetary gear system. A rotatable chuck mounted on a movable bed selects the location on the candle surface to receive the die. A linear solenoid plunges the selected and oriented tool onto the candle. This process is repeated until all marks in a desired design are completed. The planetary gear system is designed so that all tool orientations are controlled by one motor, and tool anti-rotation during travel is controlled by the face length of a sun gear.

6 Claims, 3 Drawing Sheets

COMPUTER CONTROLLED APPARATUS FOR IMPARTING A DESIGN ONTO THE SURFACE OF A CANDLE

BACKGROUND OF THE INVENTION (1) Field of the Invention

This invention relates to candle decorating, and more particularly to an automated mechanized, apparatus and process for the reproduction of hand decorated designs on candles.

(2) Description of the Prior Art

The art of hand stamping decorations on large candles is known. To manually decorate a candle, the craftsperson must hold the candle in his lap and strike its surface with the tool that imparts a desired mark. The mark consists of an indentation in the candle and depending upon the wax composition, a milky white region of tiny cracks localized around the edge of the indentation. Craftspersons in this art generally combine up to eight different tool shapes to create intricate decorations such as flowers and plants on the surface of a candle.

Most decorated candles require on the order of a thousand marks. Many of the marks are applied at various angles. A flower, for example, requires a center hub mark and petal marks angled radially about the hub. Each change of angle requires the craftsperson to rotate the candle in his lap before striking the mark. The manual method is therefore not satisfactory for the repeated reproduction of stamped candle decorations.

The prior art method of decorating candles is laborious, requires skilled labor, and does not lend itself well to large scale production and is generally exceedingly time consuming.

I have invented an automated-mechanized apparatus and method for the reproduction and production of decorated candles previously capable of being only made by hand.

SUMMARY OF THE INVENTION

This invention is directed to an apparatus:

For imparting a predetermined ornamental design into the surface of a candle or leather good comprising:

A computer controlled apparatus for impressing a design onto the surface of a work piece comprising: means for selecting a working tool having a die from a plurality of tools said working tool having placed in a fixed position and having a linear line of travel; movable support means for holding the work piece and which is capable of positioning the work piece in relation to the fixed position of the working tool; so that a selected position on the surface of the work piece is positioned along the line of travel of the working tool; means for orienting the working tool die about an axis normal to the surface of the work piece; plunger means for striking said working tool onto the work piece thereby impressing the die of the working tool onto the work piece; computer means comprising a computer and computer software programmed to produce the design for selecting the working tool, orienting the die of the working tool, positioning the work piece in relation to the working tool and controlling and actuating the plunger means to impress the die onto the work piece, and repeating steps a to d until the design is impressed on the surface of the workpiece.

The work piece can be composed of wax, leather, wood, or any compressible material.

This invention is also directed to an apparatus wherein the first stepper motor means drives the turret to select a tool from a plurality of tools; the second stepper means orients the die of the working tool; a third stepper motor means drives a chuck holding the candle to position the candle rotationally in relation to the working tool said chuck being attached to a movable platform; a fourth stepper motor means for positioning the movable platform linearly in relation to the working tool; a solenoid means drives the design of the die onto the candle; and the computer means controls the stepper motors and solenoid.

This invention is also directed to a turret apparatus having a planetary gear system which holds eight tools each having a die and each having a design on the die, however a turret holding any number of tools can be used.

DESCRIPTION OF THE PREFERRED EMBODIMENTS

Figure 1:
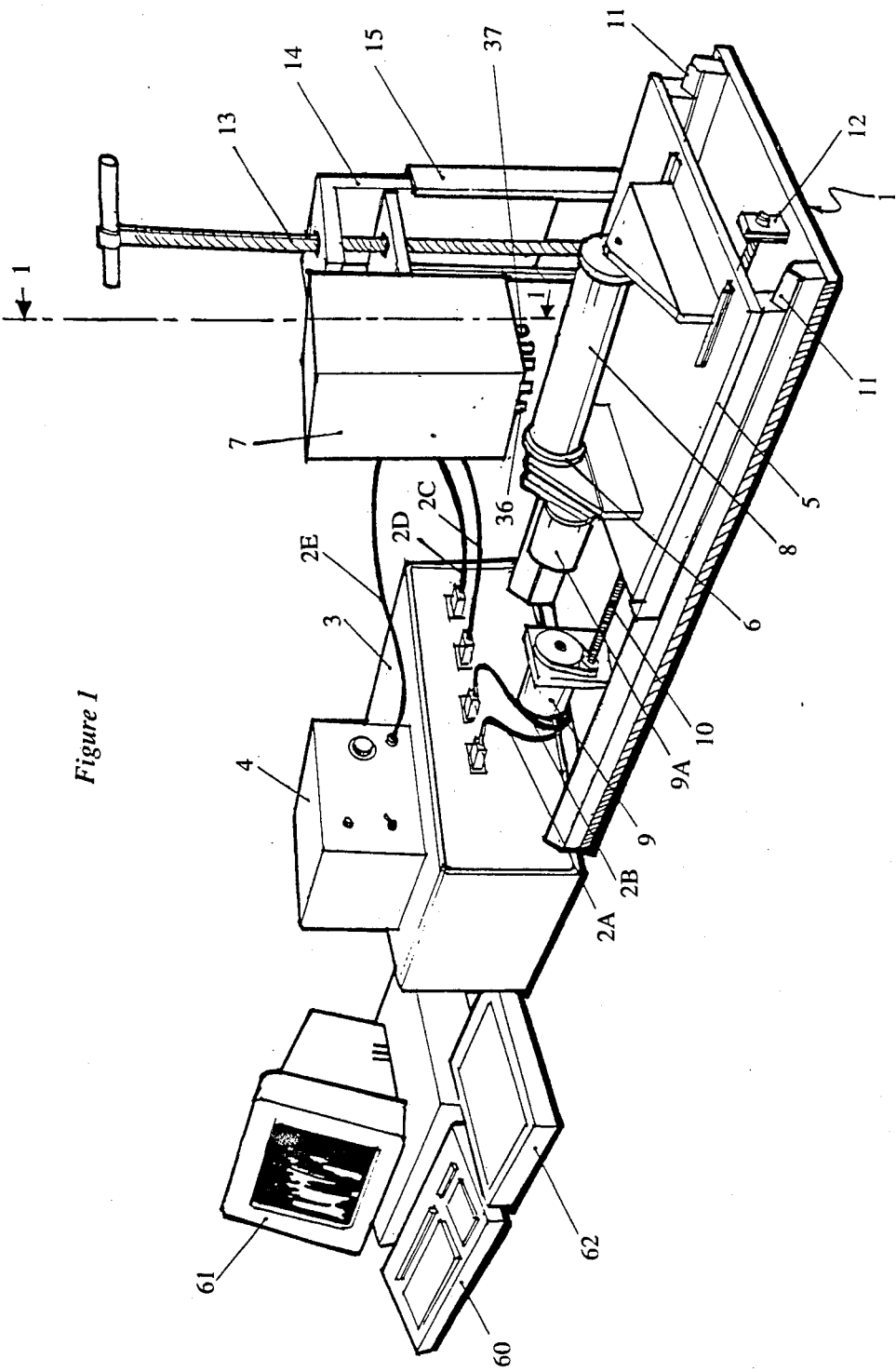
FIG. 1 is a perspective view showing my candle decorating device.
Figure 3:
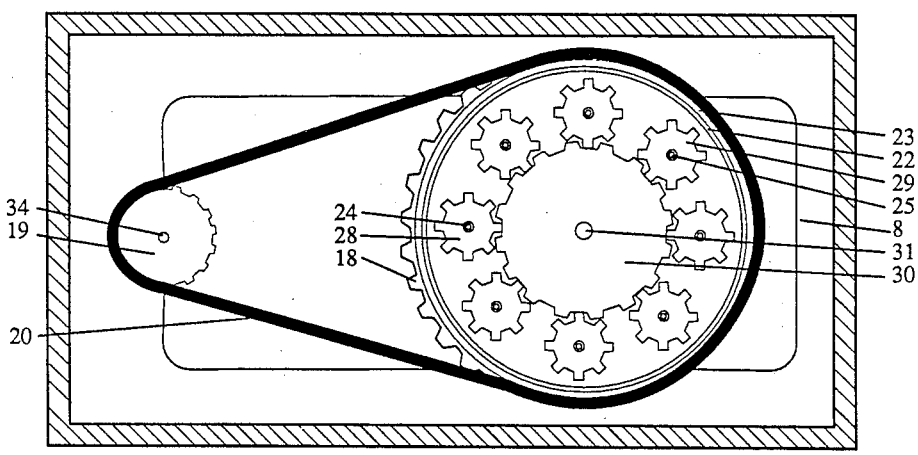
FIG. 3 is a cross sectional view of the candle stamping machinery taken along line 2—2 of FIG. 2.

In FIG. 1, 2, 3 and 4, the candle decorating apparatus is shown. The apparatus consists of a digitizer table 62, a stepper motor controller and power supply, a power supply for the solenoid 4, a leadscrew driven translating bed 5, a candle supporting chuck 6 mounted on the translating bed which holds the candle 8. The stamping machinery 7 is mounted on the machine's frame. Both the translating table and the stamping machinery are controlled by a computer loaded with the appropriate software to control the apparatus. The software is also essential for the programing of the design to be imparted on the candle. The components of my design in FIGS. 1, 2, 3 and 4 comprise:

60 Computer
61 CRT
62 Graphics Tablet or Digitizer Table
2A Stepper motor leads
2B Stepper motor leads
2C Stepper motor leads
2D Stepper motor leads
2E Solenoid leads
3 Stepper motor controller and power supply
4 Solenoid power supply
5 Translating Bed
6 Candle chuck
7 Stamping machinery cabinet
8 Candle
9 Motor for driving lead screw for the translating bed
9A Candle rotation motor
10 Lead screw for translating bed
11 Vee slide for translating bed
12 Bearing for lead screw 10
13 Lead screw for stamping machinery for positioning elevation of stamping machinery
14 Frame support for stamping machinery 15 Positioning slide for the stamping machinery elevation
17 Spacer disc
18 Base Sprocket
19 Sprocket attached to the tool change stepper motor
20 Belt for driving tool change
21 Fastener for bolting base assembly of stamping machinery holds inner bushing 22 to both the sprocket 18 and spacer 17
22 Inner bushing
23 Outer bushing
24 Working tool shaft
25 Non working tool shaft
26 Working tool return spring
27 Non working tool return spring
28 Working tool planet gear
29 Non working tool planet gear
30 Sun gear (central gear)
31 Sun gear shaft
32 Angle change drive gear
33 Tool change stepper motor
34 Tool change stepper motor shaft
35 Angle change stepper motor
35A Angle change stepper motor shaft
36 Working tool
37 Non working tool
38 Fastener
39 Solenoid support
40 Solenoid
42 Solenoid plunger shaft
43 Solenoid plunger tip
44 Working tool sleeve bushing
45 Non working tool sleeve bushing In the preferred embodiment of this machine the tooling is stationary and the workpiece (e.g.) the candle, is positioned linearly and/or angularly under the tooling.

Linear positioning of the candle 8 is accomplished through the leadscrew driven translating bed. The candle translation motor 9 drives the bed through an antibacklash leadscrew assembly 10. Because operational forces on the bed are strickly downward, a Vee arrangement is a convenient slide type. Preferably, the Vee is able to compensate so that transverse freedom cannot develop with wear, and is able to shed wax chips that occasionally fall from the candle during the decoration process.

High accuracy and resolution of the positioning components are important to assure the attractiveness of the candles. The smallest mark applied is less than one tenth of an inch in diameter, and is used to define the outline of leaves, and to fill areas between larger marks that are close together. Because the attractiveness of a candle is significantly decreased if the small marks are poorly applied, the use of antibacklash components is advantageous.

The machine is designed to decorate flat bottomed and topped candles ranging preferably from two to six inches in diameter and three to fifteen inches in length although thinner and/or longer candles can be used. It is preferable when longer candles are used to use a candle having a diameter of at least 3 inches. The requirements imposed on the chucking system include securely holding any of these candles while allowing the entire length of the candle to be exposed to stamping. The chuck 6 is also responsible for driving the rotation of the candle while not causing wax to crumble or crack.

The system of chucking in the preferred embodiment consists of compressing the candle between flat plates, each of which have small spikes to press into the candle. To insure against cracking the ends of the candle, the spikes are pointed, short, of small diameter, and positioned far from the edge of the candle. The plates are the same diameter, or smaller, as the candle to be decorated to allow tools to access all of the candle without hitting the chuck plates. The chuck is adjustable to accomodate the various length candles.

The functions performed by the stamping machinery include selecting. orienting, guiding and stamping the desired tool onto the surface of the candle at the location selected by the positioning system. A multi-tool and preferably an eight tool planetary gear system turret controlled by two stepper motors performs the selecting, orienting, and guiding operations. A linear solenoid provides the stamp. An adjustable support structure solidly positions the turret above any of the different diameter candles. Cabinetry provides protection for the machinery and the user.

Angle change when referred to herein means the rotation about the vertical axis Z of the tool shaft 24 to orient non-circular designs on the tip of the tool for impression on the candle.

Figure 2:
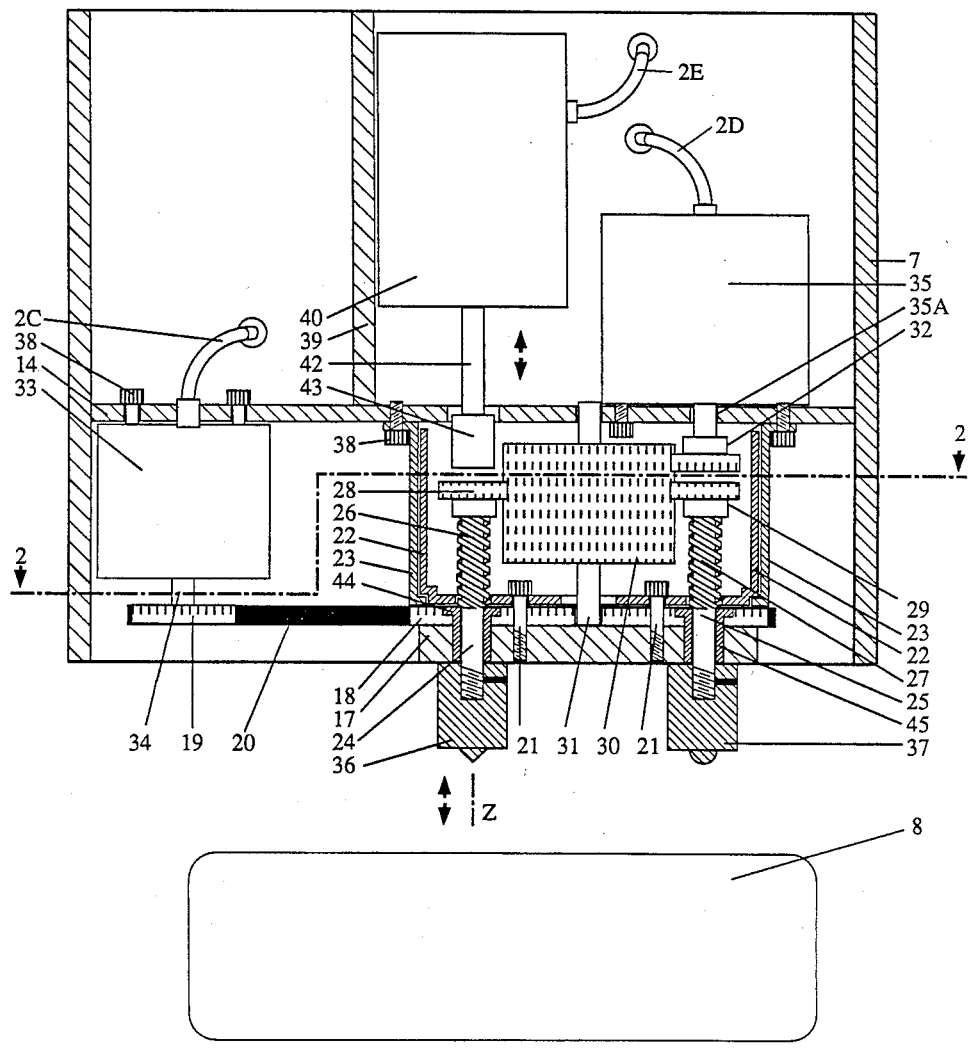
FIG. 2 is a cross sectional of the candle stamping machinery taken along line 1—1 of FIG. 1.
Figure 4:
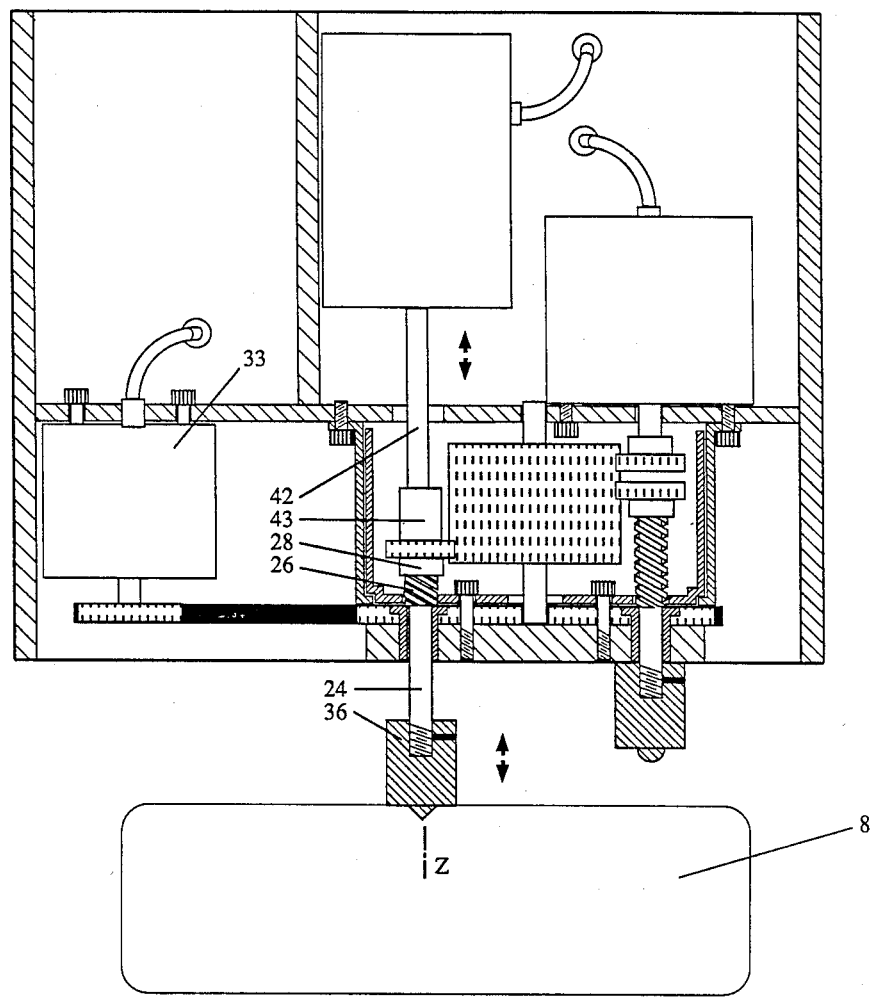
FIG. 4 is a cross sectional view of a cross section of the candle stamping machinery in stamping position taken along line 1—1 of FIG. 1.

The design of the turret and solenoid arrangement is illustrated in FIG. 2. The tools, which can be custom shaped out of the tool blanks are each threaded and fastened onto a tool shaft. Working tool shaft 24 passes through a sleeve bushing 44 and the base sprocket 18. In operational connection to the top of shaft 24 is a planet gear 28 which is in operative engagement with the sun gear 30. The tool angle change stepper motor 35 also has a gear 32 engaged with the sun gear. A stepped bushing is bolted directly to the base sprocket and spacer assembly. An outer bushing contains a ledge that catches beneath the step of the inner bushing and is bolted to an overhead support plate. The inner bushing and the components bolted to it are supported vertically by the outer bushing 23 but are free to rotate about a central vertical axis. The solenoid 40 is supported by a vertical plate 39 above the tool in the "working position" of the turret. The working tool 36 is the only tool which can be stamped at any one time.

The events to make a mark on a candle 8 are as follows. While the positioning system selects the right location of the candle 8 to be beneath the working tool, the turret selects and orients the working tool 36. A belt 20 is fitted around the base sprocket and is driven by the tool change stepper motor 33. When the tool change motor actuates, the chain causes the base sprocket and inner bushing assembly to rotate in the outer bushing. The working tool is selected in this manner. To adjust the angle of the working tool about its vertical axis, the angle change stepper motor rotates the sun gear and consequently all of the tool assemblies within their sleeve bushings. Once the candle 18 is positioned and the correct tool is selected and oriented, the shaft of the solenoid 42 impacts the top of the working tool assembly. Contact is made with the tip 43 of the solenoid plunger shaft. The working tool shaft 24 slides through its sleeve until the tool makes contact with the candle 18. Following the impact, the compression spring and a spring inside the solenoid return the system to the original positioning. The cycle is ready to repeat.

The stamping machinery accomplishes complete control over the tools with just two motors and no linear slides as a result of several attributes. First, several of the components of the turret are multifunctional. Second, the linking of all the tools in a planetary gear train allows each rotational motion to have the identical affect on all eight tool assemblies. It is because of this coupling of motions that stored data needed for control is also minimized. Just two numbers are stored for each mark in the design data file to completely define the location and orientation of each of the eight tools in the turret. Finally, although the selection or reorientation of the working tool affects all tools equally, the turret is designed so that selection of a new tool does not affect the orientation value stored in the data file, and reorientation of the tools does not affect the selection value stored. By coupling motion of the eight tools together, while keeping the type of motion (selection or orientation) independant, hardware, software and storage requirements are minimized.

One of the multifunctional parts and the heart of this system is the sun gear 30. As already mentioned, the primary role of this gear is to adjust the angle of the working tool 36. This gear also maintains the orientation of the tool 24 during its motion toward the candle. The sun gear teeth serve as guides to the sliding planet gear 28 during this motion. By adjusting the angles of all of the tools simultaneously, the sun gear makes file-management in the programs considerably easier. Instead of tracking eight angles, the programs only need to track one. An integer three to one ratio between the number of teeth on the sun and the planet gears was chosen to make the data-handling additionally easier. When tools are changed, the sun gear 30 is locked by the angle change stepper motor and the planet gears roll around the sun gear. By having an integer ratio and controlling the initial angle of all the tools at assembly, the new working tool arrives at the same angle as the previous working tool regardless of the direction of turret rotation. Consequently, the programs only record an angle change when the angle change motor actuates but not when the tool selection motor actuates. Although the angles and selection of the eight tools is controlled simultaneously by the two motors, the information needed for control remains uncoupled.

Another multifunctional component of the turret is the inner thrust bushing. In addition to providing thrust and radial support while allowing rotational freedom, the bushing secures the sleeve bushings in place and provides seats for the return springs. Although the sleeves are pressed into the spacer to insure their vertical orientation, the possibility that they can work loose from the shocks of operation is present if no positive stop is used. The holes in the bushing are large enough for the springs to seat in, yet small enough to partially cover the flanges of the sleeves. By providing seats for the springs and by selecting springs with large enough inside diameters to provide clearance around the shafts, friction losses due to the spring wire rubbing against the tool shaft is avoided.

The outer thrust bushing supports the turret from the overhead support frame and acts as a protective casing for the turret machinery. The length of the bearing surfaces is as long as possible under the geometric constraints present in order to reduce the coefficient of friction and the maximum angle that can be present between the centerlines of the two bushings. Should a large angle be present, an error would occur in the location of marks on the candle.

The solenoid 40 is selected to produce enough tool impact energy for any of the marks to obtain the desired size and whiteness from the resulting stress cracks. Several mechanisms are used to control the depth and quality of each mark individually. Delay loops in the control program allow the full thrust of the solenoid 40 to develop before the voltage is removed from the windings. The program uses a longer delay loop for the largest area marks than for the smaller marks. The smallest mark uses no delay loop at all. To further control the depth of the smallest mark, a stiffer return spring 26 can be used than for the other tools. For the largest marks, the machine can be programmed to strike multiple times at the same location to increase the area and depth of the mark. Finally, variable voltage supply 4 powers to the solenoid 40. Smaller marks are applied with a lower voltage than the larger marks as a further control of the depth of indentation.

The control software system (which is more particularly described in my disertation for the degree, Master of Mechanical Engineering at Bucknell University files in the Bucknell University Library, Bucknell University, Pennsylvania, September 1986, is as follows:

The control software system is comprised of four main operational programs and a menu driven software control program that interfaces with the user from the time the computer is activated.

The first operational program accepts entry of the geometric information from the digitizer that defines the desired candle design and provides a graphical verification of the data as it is entered to the digitizer. To reproduce a hand decorated design, the user must wrap a piece of paper of dimensions equal to the length by the circumference of the candle around the candle. Pressing a pencil lead over the paper covered candle will transfer candle mark shapes and their locations to the paper. The paper is laid on the digitizer tablet. The data entry program will accept the information to describe the design. The user touches the electronic pen of the digitizer to the center of each mark. The computer records the coordinates of the mark in a data file record along with a mark number (corresponding to a tool location in the turret) and a mark angle as entered through keystroke entries. Once all marks have been touched, the geometric data file describing the design is completed. The process can be altered using a desired paper design that has never been hand decorated.

The second program organizes the data into the order the machine will apply the marks to the candle and, using calibration factors, computes the number of motor steps each motor must make to locate and apply each of the marks of the design. A data file with this motor step information is stored for the design and is used each time the machine is run to apply that design to a candle.

The third program calls upon the motor step data file for a desired design and controls the operation of the machine during the application of the design.

The fourth and final program provides a graphical verification should the user wish to see on the CRT a design that has been entered.

My method is equally applicable for inscribing a design into leather and plastics. The time required to impart a design of about 1500 marks over the surface of a 9 inch candle with diameter of 3 inches is about 20 minutes.

There is disclosed several embodiments according to the invention. It will be obvious that changes and variations can be made thereto without departing from the spirit of the invention which is limited only by the scope of the claims annexed hereto:

I claim:

1. A computer controlled apparatus for stamping a design into a work piece's surface comprising:
    (a) stepper motor driven turret means for:
        (i) selecting a working tool having a die and a vertical axis from a plurality of tools, said working tool being placed in an operating position and having a line of travel normal to the work piece surface;
        (ii) orienting the working tool die about said vertical axis;
        (iii) maintaining the orientation of the working tool die during stamping travel; and
        (iv) controlling the orientation of the other tools in the turret;
    wherein the orientation of the working tool and the other tools are controlled with one stepper motor;
    (b) movable support means for holding the work piece which is capable of positioning the work piece in relation to the operating position of the working tool; whereby a selected position on the surface of the work piece is positioned along the line of travel of the working tool;
    (c) plunger means for striking said working tool into the work piece thereby stamping the die of the working tool into the surface of the work piece;
    (d) computer means for:
        (i) selecting the working tool;
        (ii) orienting the die of the working tool;
        (iii) positioning the work piece in relation to the working tool; and
        (iv) controlling and actuating the plunger means to stamp the die onto the work piece; and
    (e) computer means for controlling and repeating steps (a) to (d) until the design is stamped into the surface of the work piece.

2. The apparatus of claim 1 wherein the stepper motor driven turret means for selecting and orienting the working tool comprises a stepper motor driven planetary gear system comprising a sun gear operatively engaged with a plurality of planet gears each operatively connected to a separate tool slidably passing through a base of the planetary gear system wherein a first stepper motor selects a working tool from a plurality of tool positions by rotating the base of the planetary gear system which positions the planet gears in relation to the sun gear and the plunger means; a second stepper motor operatively connected to the sun gear, orients the working tool and all non-working tools simultaneously while the first stepper motor prevents undesirable rotation of the base of the planetary gear system; and a plunger means which drives the working tool and the planet gear in operative connection therewith, said planet gear being slidably engaged with the sun gear thereby preventing reorientation of the die during translation.

3. The apparatus of claim 2 wherein the work piece is a candle.

4. The apparatus of claim 3 wherein a first stepper motor means drives the base of a planetary gear system turret to select a working tool from a plurality of tools into the operating position; a second stepper motor means drives the sun gear of said planetary gear system to simultaneously orient the working tool and the non-working tools; a third stepper motor means drives a chuck holding the candle to position the candle rotationally in relation to the working tool said chuck being attached to a movable platform; a fourth stepper motor means positions said movable platform linearly in relation to the working tool, and a linear solenoid means drives the die of the working tool into the candle.

5. The apparatus of claim 2 wherein the planetary gear system turret supports a plurality of tools each having a different die.

6. A process for stamping a predetermined ornamental design into the surface of a candle comprising; (a) selecting and angularly orientating a working tool from a plurality of tools, each tool having a die thereon; (b) selecting a location on said candle to receive the stamp of the working tool die, the candle being mounted on a motorized rotational chuck mounted on a motorized linear platform; (c) stamping said die of said working tool into the candle positioned to receive said die; (d) controlling, by computer means, the selection of the working tool, the angular orientation of the working tool, the linear and angular position of the candle in relation to the working tool and the stamping of the die of the working tool into the candle; and
    (e) repeating steps (a) to (d) until a predetermined ornamental design has been stamped into the surface of the candle.

* * * * *